March 25, 1941.    H. L. OLSON    2,236,377
VOLTAGE CONTROLLED TOASTER TIMER
Filed Aug. 15, 1940    3 Sheets-Sheet 2
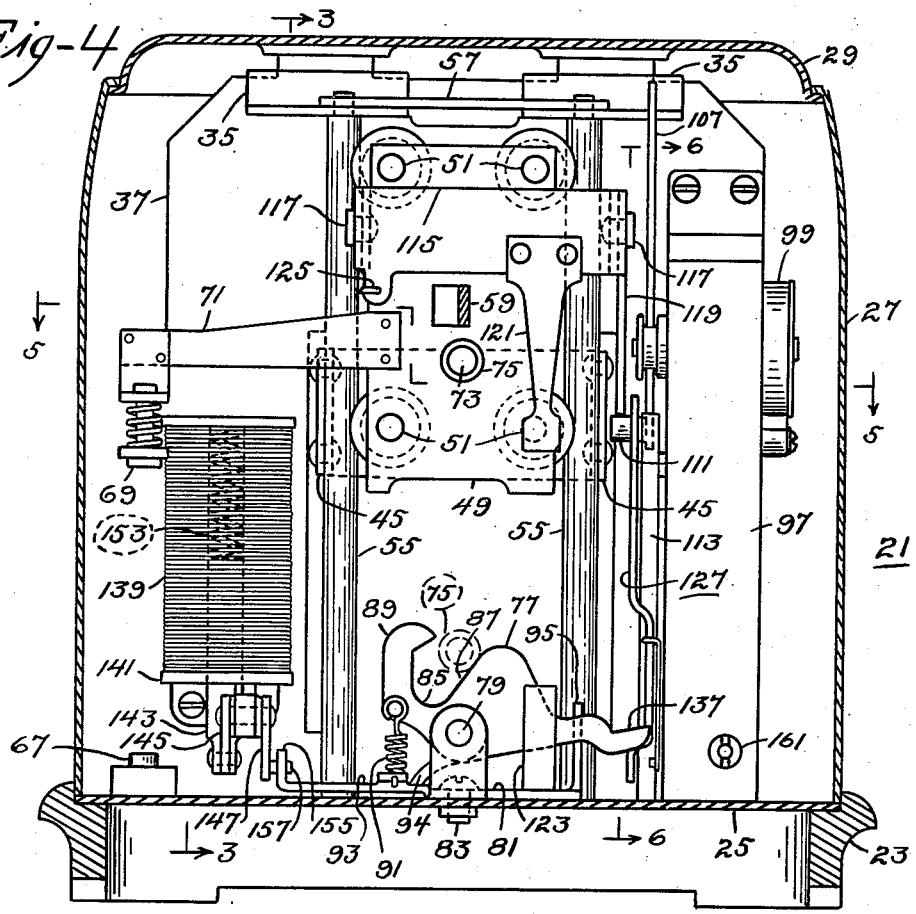
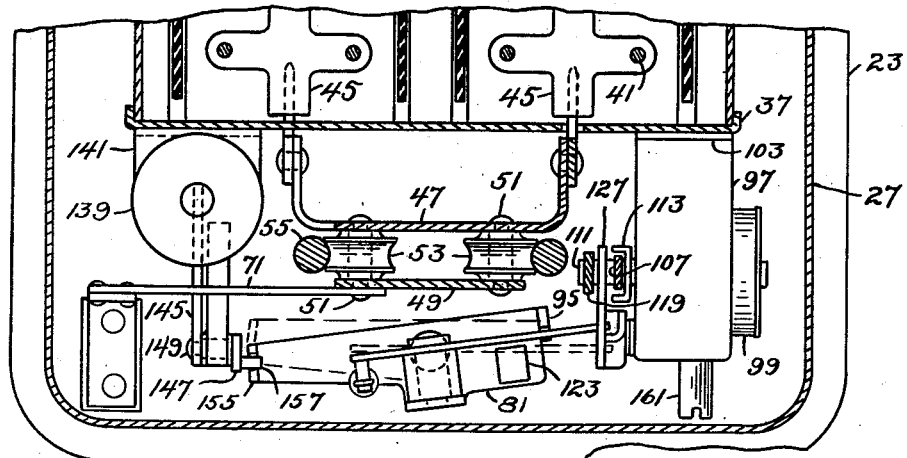
INVENTOR
HENRY L. OLSON
BY
ATTORNEY March 25, 1941. H. L. OLSON 2,236,377
VOLTAGE CONTROLLED TOASTER TIMER
Filed Aug. 15, 1940 3 Sheets-Sheet 3
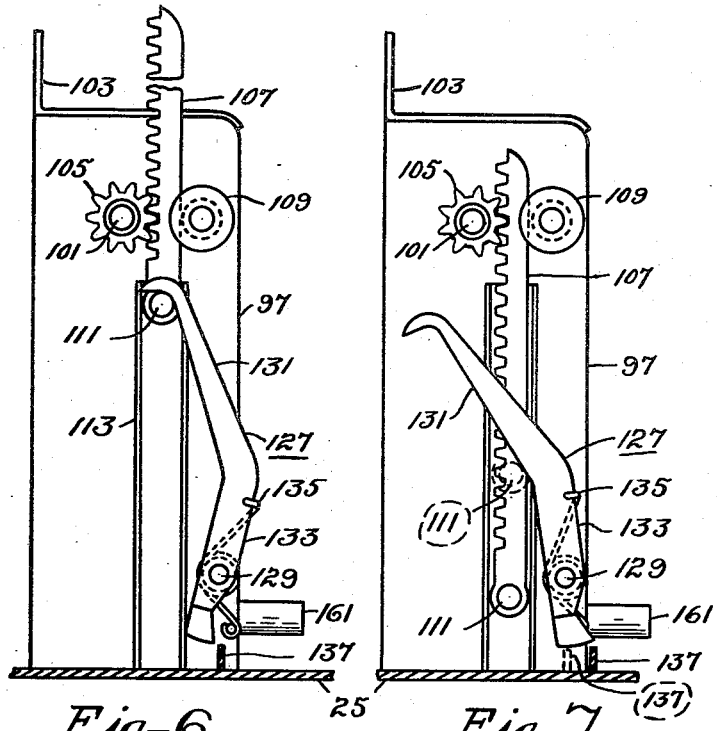
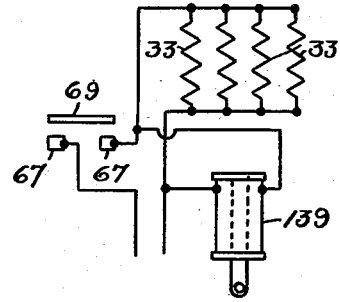
INVENTOR
HENRY L. OLSON
BY
ATTORNEY Patented Mar. 25, 1941

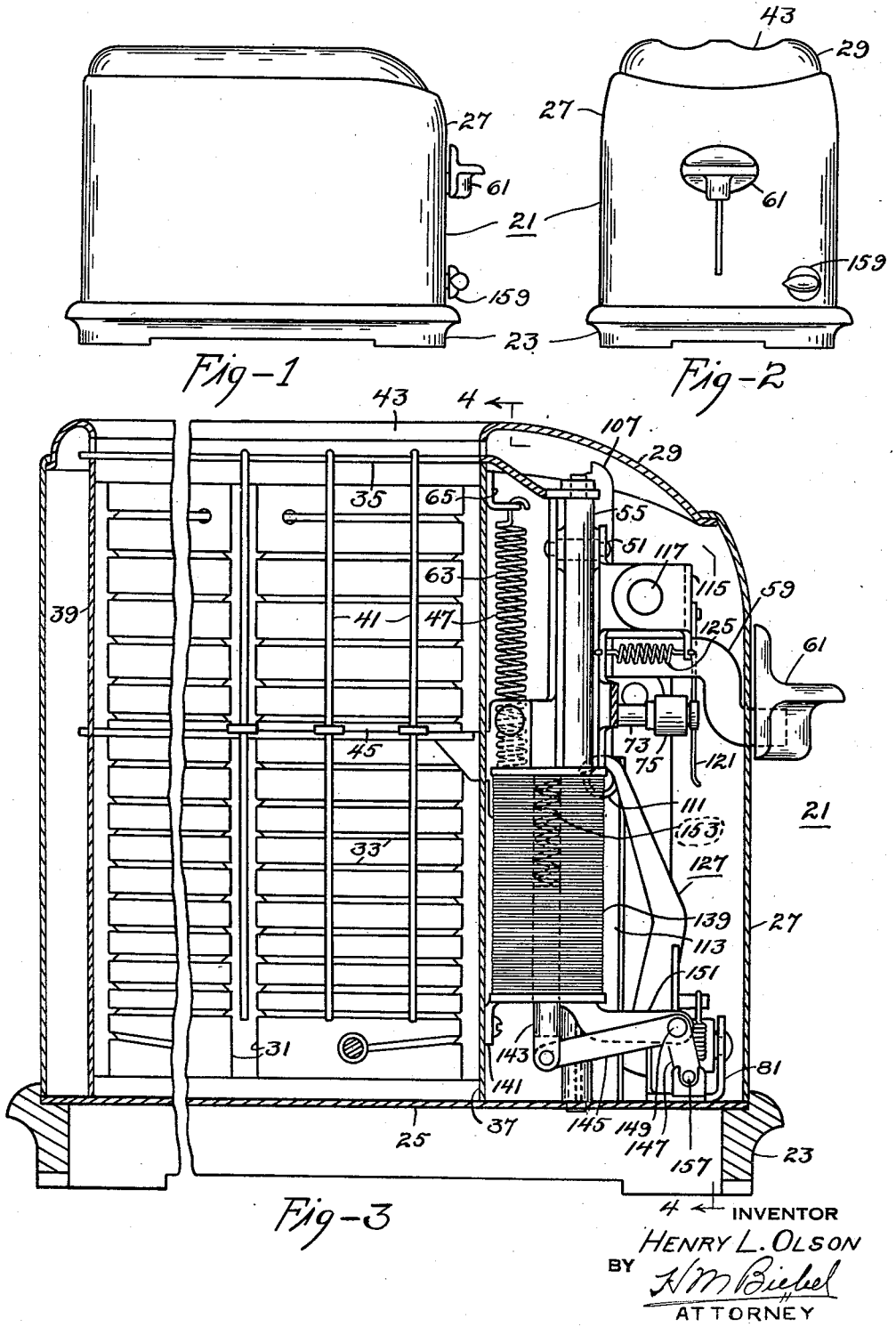

2,236,377

UNITED STATES PATENT OFFICE 2,236,377

VOLTAGE CONTROLLED TOASTER TIMER

Henry L. Olson, Elgin, Ill., assignor to McGraw Electric Company, Elgin, Ill., a corporation of Delaware Application August 15, 1940, Serial No. 352,725

6 Claims. (Cl. 161—16)

My invention relates to intermittently operable cooking appliances and particularly to timer controlled electric toasters.

An object of my invention is to provide a relatively simple means for varying the duration of a toasting operation in an electric toaster.

Another object of my invention is to provide a relatively simple voltage controlled means for varying the speed of operation of a mechanical timer controlling the duration of a cooking operation.

Still another object of my invention is to provide voltage controlled electromagnetic means for varying the duration of a cooking operation provided by a constant speed timer.

Still another object of my invention is to provide voltage controlled electromagnetic means for varying the interfitting overlap of a latch and a detent for varying the duration of a toasting operation.

In the drawings,

Figure 1 is a view in side elevation of an electric toaster embodying my invention, Fig. 2 is a view in front elevation thereof, Fig. 3 is a longitudinal vertical sectional view through a toaster taken on the line 3—3 of Fig. 4, the parts being shown in non-toasting positions, Fig. 4 is a vertical lateral sectional view taken on the line 4—4 of Fig. 3, with the parts shown in the same positions as they occupy in Fig. 3, Fig. 5 is a fragmentary horizontal sectional view taken on the line 5—5 of Fig. 4, Fig. 6 is a fragmentary view taken on the line 6—6 of Fig. 4, the parts being shown in non-toasting positions, Fig. 7 is a fragmentary view similar to Fig. 6 except that the parts are shown in toasting positions, and, Fig. 8 is a diagram of the electric circuits of the toaster.

An electric toaster assembly 21 may comprise a skeleton frame 23 of moulded composition material now used in the art which skeleton frame has suitably secured against its upper surface a base plate 25. The base plate 25 has resting thereon the lower edge of an outer casing 27 which casing may comprise two side walls and a front and a rear wall. A cover member 29 may have interfitting engagement with the upper flanged edge portion of the outer casing 27, all in a manner well known in the art.

The toaster assembly includes a plurality of vertically-extending planar heating elements each including one or more sheets of electric insulating material 31, such as mica, on which there may be wound a resistor strip 33, all in a manner well known in the art. The lower edge portions of the mica sheets 31 may have interfitting engagement with the bottom plate 25 or may be held thereon in proper vertically-spaced positions by any suitable means not pertinent to my invention. The upper end portions of the mica sheets 31 may be held by interfitting engagement with top frame plates 35 the front and the rear end portions of which may be secured to a front intermediate wall 37 and a rear intermediate wall 39 and guide and guard wires 41 may be suspended from and supported by the top frame plate 35, all in a manner well known in the art. The top frame plates 35, of which I provide as many as the design of the toaster calls for as to the number of slices of bread to be toasted simultaneously, are each provided with an opening therethrough registering with an opening 43 in the cover member 29 to permit of inserting fresh slices of bread into the toasting chambers and of removing the toasted slices of bread therefrom in a manner now well known in the art.

Means for supporting one or more slices of bread may include one or several bread carriers 45 which are spaced between pairs of spaced-apart toast heating elements and these bread carriers have vertical movement relatively to the heating element, from the position shown in Fig. 3 of the drawings which is their upper or non-toasting position, to a lower position where the entire surfaces of slices of bread resting thereon will be subjected to radiant heat from the planar heating elements. The rear and front end portions of the carriers extend through cooperating slots in the rear and in the front intermediate wall and the front end portions of the bread carriers may be connected by a cross bar 47 of substantially channel shape which cross bar 47 may constitute a rear carriage plate, as will be hereinafter described in detail.

A front carriage plate 49 is also provided, these two members 47 and 49 being spaced apart by studs 51 of which four are provided and rollers 53 are rotatably mounted on the plurality of studs 51 so that the carriage plates may have vertical movement on two vertically-extending standards 55. The lower ends of these studs may have interfitting engagement with the base plate 25 while the upper end portions thereof may have interfitting engagement with front end portions of the top frame plates 35, all as is now used in the art. If desired I may provide a top cross bar 57 also interfitting with the upper ends of the standards 55. The front carriage plate 49 is provided with a forwardly-extending bar 59 projecting through a slot in the front wall of casing 27 on which an actuating knob 61 may be mounted in front of and outside of the casing portion 27. Downward pressure of an operator on knob 61 will cause downward movement of the carriage plates and of the bread carriers, all as now known in the art. A bias coil spring 63 has its upper end connected to a bracket 65 secured against the front surface of the front intermediate wall 37 and has its lower end connected to any portion of the carriage plate assembly so that the spring 63 will bias the bread carriers to their upper or non-toasting position substantially as shown in Fig. 1 of the drawings.

Means for controlling the energization of the toast heating elements including more particularly the resistor conductors 33 may include a pair of contact members 67 insulatedly mounted on the base plate 25 and a contact bridging member 69 carried by a support 71 by one end of which the contact bridging member 69 is insulatedly and resiliently supported while the other end of member 71 is fixedly secured to the front carriage plate 49. When the bread carriers and the carriage plates are moved downwardly, contact bridging member 69 will engage contact members 67 to thereby cause closing of an energizing circuit through the toast heating elements.

Means for holding the bread carriers in their lowered and toasting position may include a stud or short shaft 73 secured to the front carriage plate 49 and extending forwardly thereof and having a roller 75 rotatably mounted thereon at its forward end. A latch member 77 of substantially L-shape, the form or shape of which is shown particularly in Fig. 4 of the drawings, is pivotally mounted on a pivot pin 79 carried by a bracket-like supporting member 81 which is pivotally mounted on base plate 25 as by a short machine screw 83 to permit of turning movement in a horizontal plane. Latch member 77 is provided with a recess 85 formed between an angularly-extending surface 87 thereof and a substantially vertically-extending arm 89, all as shown in Fig. 4 of the drawings. The latch member 77 is normally yieldingly biased in a counterclockwise direction by a tension spring 91 connected to say the lower end of arm portion 89 and to a lug on the left-hand end portion 93 of support 81, said counter-clockwise movement being limited by the engagement of a depending arm 94 integral with latch 77 which engages the upper surface of member 81. The right-hand end portion of member 81 may be provided with an upstanding bar 95 to act as a guide for the latch 77. When the carriage plates and the carriers are moved downwardly roller 75 will initially engage the angularly-extending surface 87 of latch 77 at a point vertically displaced from the axis of pivot pin 79 so that latch member 77 will be caused to turn in a clockwise direction until the hook end of extension 89 will move over the roller 75 to an extent sufficient to prevent upward return movement thereof as long as the latch 77 is held in its position to which it was actuated by the downward movement and engagement of roller 75 therewith as hereinbefore described.

Means for determining the duration of a toasting or cooking operation may comprise a mechanical timer 97 which may include a clock spring 99 mounted on an arbor 101 and which may include further a train of gears all of which may be mounted in a suitable casing shown in the drawings as being of elongated vertical shape and adapted to rest on the bottom plate 25 and be held thereagainst by a holding bracket 103. I may here point out that while it is possible to use a variable speed mechanical timer of the kind disclosed and claimed in Ireland Patent No. 1,866,808, my invention is not limited thereto but finds a field of usefulness when adapted to operate with a constant speed timer in the control of the duration of a toasting or cooking operation as determined by a mechanical timer.

The arbor 101 has mounted thereon a pinion 105 which pinion is adapted to be engaged by the teeth of a rack bar 107 which rack bar is adapted to move vertically relatively to the timer structure, being held in meshing position relatively to the pinion 105 by a grooved roller 109. The lower end of rack bar 107 is provided with a laterally-extending pin 111 and the lower end of rack bar 107 is adapted to move vertically in a track 113 which is of substantially channel shape, as shown more particularly in Fig. 5 of the drawings.

It is desired to wind up the timer and more particularly the spring 99 by downward movement of the carriage plate and the bread carriers and in order to effect this I provide a pivotally mounted front plate 115 secured to the front carriage plate 49 as by a plurality of pivot pins 117 mounted in forward extension of plate 49, member 115 being of substantially channel shape in longitudinal section. The right-hand end portion of member 115 is provided with a depending arm 119 which is normally adapted to have its lower end engage pin 111 on rack bar 107 so that downward movement of member 119 will cause downward movement of rack bar 107 with resultant winding up of the mechanical timer.

As it is desired to cause disengagement of the lower end of arm 119 from pin 111 when the bread carriers have been moved into their downward position, I provide a spring arm 121 having its upper end mounted on member 115 and having its lower end depending therefrom and adapted to be engaged by the inclined-surface upper end portion of a bar 123 the lower end of which is fixedly mounted on the right-hand portion of support 81. It may be here pointed out that the latch 77 pivotally mounted in bracket 81 has limited turning movement on pin or machine screw 83 in a horizontal plane as will be hereinafter referred to in detail. The relative positions of member 123 and the lower end of spring bar 121 are such that the plate 115 will be turned on its pivot pins 117 to cause forward movement of the lower end of bar 119 with resultant disengagement thereof from pin 111 at substantially the time that roller 75 engages and is held by the latch member 77. A small tension spring 125 is connected to member 115 and to member 49 to normally yieldingly hold plate 115 in a position to cause the lower end of bar 119 to engage pin 111 as hereinbefore described.

The timer is provided with a detent lever 127 which has its lower end portion pivotally mounted on a pivot pin 129 which pivot pin may be mounted on the frame structure of timer 97. The detent lever arm 127 comprises an upper end portion 131 which extends angularly relatively to the lower end portion 133, all as shown in Figs. 6 and 7 of the drawings. A small biasing spring 135 normally yieldingly holds the detent arm 127 in substantially the position shown in Fig. 7 of the drawings. When in this position the upper portion 131 is adapted to extend over the path of travel of pin 111 for a purpose to be hereinafter referred to in detail. It may be here pointed out that the position into which the detent lever arm 127 is normally yieldingly biased and the position of a right-hand extension 137 of latch member 77 may be such that the overlapping interengagement of the lower end surface of portion 133 and of member 137 may be as shown in Fig. 7 of the drawings. It is evident that only a relatively limited amount of turning movement of detent lever arm 127 in a clockwise direction is necessary to cause disengagement of latch portion 137 from the detent lever with resultant quick upward movement of the bread carriers into non-toasting position and attendant deenergiaztion of the heating elements.

My invention includes more particularly voltage controlled electromagnetic means for varying the amount of overlapping interengagement of number 137 with the lower end of portion 133 of the detent lever by movement of the latch member and its support in a horizontal plane whereby the amount of overlap may be varied.

I provide an electromagnet coil 139 which may be suitably secured against the front intermediate wall 37 by a bracket 141 and this coil is electrically connected in parallel circuit relation relatively to the toast heating elements but is controlled by the switch comprising the contact bridging member 69 and the pair of contacts 67 hereinbefore described. It is evident that when a toasting operation is initiated as hereinbefore described, that coil 139 is energized.

I provide a magnetic armature core 143 movable within the coil 139 and which has its lower end pivotally connected with one portion 145 of a bell crank lever which includes in addition to arm 145 a second arm 147 extending substantially at right angles to arm 145. The bell crank lever is pivotally mounted on a pivot pin 149 supported by an extension 151 of bracket 141. Armature core 143 is normally yieldingly biased to a lowered position by a compression spring 153 positioned within the coil 139. The left-hand end portion of member 93 is provided with a forked, upwardly-extending portion 155 which is adapted to receive a pin 157 fixedly mounted in the lower end of arm 147. Fig. 5 of the drawings will indicate that when armature core 143 is in the position shown in Fig. 1 of the drawings with pin 157 in a forward position the bracket 81 will have its left-hand end relatively close to the front wall of the casing with its right-hand end relatively far away from the front wall of the casing so that member 137 will be in the position shown by the broken lines in Fig. 7 of the drawings. This is the normal position of member 137 relatively to detent lever 127 when the toaster is not energized. If the toast heating elements of the toaster are electrically connected to a source of supply of electric energy which has a relatively low voltage, say on the order of 100 volts, the value of the current traversing the coil 139 is relatively small and only a small degree of upward movement of the armature core 143 will be effected with attendant relatively small motion of member 137 in a right-hand direction, as seen in Figs. 6 and 7 of the drawings. If, on the other hand, the toaster is electrically connected to a source of supply of abnormally high voltage, say on the order of 125 or even 130 volts, it is evident that the current traversing the coil 139 will be relatively large and the degree of upward movement of armature core 143 will be greater with consequent greater turning movement of the latch on its pivot 83 with resultant position of member 137 as shown, for example, in Fig. 7 of the drawings. It is evident that the degree of turning movement of the bent lever arm 127 on its pivot pin 129 to be effected by upward movement of rack bar 107 and of the pin 111 engageable with arm 127 will be much smaller to effect disengagement of the lever arm from the latch member 137 when the initial position of latch member 137 is as shown in the full lines in Fig. 7 of the drawings than would be the case if the initial position of member 137 had been as shown by the broken lines in Fig. 7. It is therefore evident that the voltage controlled electromagnet means hereinbefore described is effective to immediately vary the position of the latch relatively to the detent engaged thereby and it is only necessary to ensure that contact bridging member 69 will cause energization of the toast heating elements and of coil 139 a short interval of time before the limit of downward movement of the vertically movable bread carrier parts has been reached so that detent member 137 may move freely relatively to the lower arcuate end surface of portion 133 of the detent lever before the latch and the detent are in engagement with each other.

As noted above it is, of course, possible to use instead of a constant speed mechanical timer an adjustable or variable speed timer and my invention includes both types of mechanical timers and when a variable speed timer is used it may be provided with an adjusting knob 159 mounted on a speed changing shaft 161.

When a toaster is energized from a low voltage source of supply a longer time is required to toast a slice or slices of bread to a given degree than is the case when the toaster is energized from a high voltage source. The degree or amount of overlapping engagement of the latch with the detent is thus automatically and quickly changed in accordance with the voltage of the supply circuit, by electromagnetic voltage-controlled means to ensure substantially uniform toasting of slices of bread irrespective of different supply circuit voltages.

While I have illustrated and described a single embodiment only it is obvious that modifications may be made therein without departing from the scope of my invention and all such modifications clearly coming within the scope of the appended claims are to be considered as being covered thereby.

I claim as my invention:

1. Means for controlling the duration of a toasting operation of an automatic electric toaster comprising a toast heating means, a bread carrier movable into toasting and non-toasting positions relatively to the toast heating means and normally yieldingly biased into non-toasting position, means to cause movement of the carrier into toasting position and a pivotally supported latch member for holding said carrier in toasting position, said duration controlling means including a timing means adapted to be energized simultaneously with movement of the carrier into toasting position, a pivotally-mounted detent member adapted to overlappingly engage the latch member to hold the latter in carrier-holding position and adapted to be turned on its pivot by the timing means to be disengaged from the latch member and electromagnetically actuated means for causing movement of the latch member relative to the detent member before engagement therebetween to vary the amount of overlap of said members and thereby the length of time before disengagement therebetween by said timing means.

2. Means for controlling the duration of a toasting operation of an automatic electric toaster comprising a toast heating means, a control switch therefor normally yieldingly biased to open position, means to cause closing of said switch to initiate a toasting operation and a pivotally supported latch member for holding the switch in closed position, said duration controlling means including a timing means adapted to be energized simultaneously with closure of the control switch, a pivotally-supported detent member adapted to overlappingly engage with the latch member to hold the latter in switch-closing position and adapted to be turned by the timing means to disengage the latch member therefrom and electromagnetically-actuated means controlled in accordance with the voltage applied to the toast heating means for varying the amount of overlap of the latch and detent members to vary the length of time to effect disengagement therebetween.

3. Means for controlling the duration of a toasting operation of an automatic electric toaster comprising a toast heating means, a control switch therefor normally yieldingly biased to open position, means to cause closing of said switch to initiate a toasting operation and a pivotally supported latch member for holding the switch in closed position, said duration-controlling means including a timing means adapted to be energized simultaneously with closure of the control switch, a pivotally-supported detent member adapted to overlappingly engage with the latch member to hold the latter in switch-closing position and adapted to be turned by the timing means to disengage the latch member therefrom and electromagnetically - actuated means controlled in accordance with the voltage applied to the toast heating means for causing movement of the latch member before engagement thereof with the detent member to decrease the amount of overlap whereby to reduce the length of time required by the timing means to effect release of the detent member from the latch member with increase in the voltage applied to the toast heating means.

4. Means for controlling the duration of a toasting operation of an automatic electric toaster comprising a toast heating means, a bread carrier movable into toasting and non-toasting positions relatively to the toast heating means and normally yieldingly biased into non-toasting position, means to cause movement of the carrier into toasting position and a pivotally supported latch member for holding said carrier in toasting position, said duration controlling means including a mechanical timer adapted to be wound by said carrier-moving means, a pivotally-mounted detent member adapted to overlappingly engage said latch member and to be turned through a predetermined angle by the timer to effect disengagement thereof from the latch member and electromagnetically-actuated means connected with the latch member for moving the same before engagement thereof with the detent member relatively to the detent member to decrease the length of time required by the timer to effect disengagement between the latch and detent members with increased voltage applied to the toaster.

5. Means for controlling the duration of a toasting operation of an automatic electric toaster comprising a toast heating means, a bread carrier movable into toasting and non-toasting positions relatively to the toast heating means and normally yieldingly biased into non-toasting position, means to cause movement of the carrier into toasting position and a pivotally supported latch member for holding said carrier in toasting position, said duration controlling means including a timing means adapted to be energized simultaneously with movement of the carrier into toasting position, a pivotally-mounted detent member adapted to overlappingly engage the latch member to hold the latter in carrier-holding position and adapted to be turned on its pivot by the timing means to be disengaged from the latch member and electromagnetically actuated means for causing movement of one of said members relatively to the other member before engagement therebetween to vary the amount of overlap of said members and thereby the length of time before disengagement therebetween by said timing means.

6. Means for controlling the duration of a toasting operation of an automatic electric toaster comprising a toast heating means, a control switch therefor normally yieldingly biased to open position, means to cause closing of said switch to initiate a toasting operation and a pivotally supported latch member for holding the switch in closed position, said duration controlling means including a timing means adapted to be energized simultaneously with closure of the control switch, a pivotally-supported detent member adapted to overlappingly engage with the latch member to hold the latter in switch-closing position and adapted to be turned by the timing means to disengage the latch member therefrom and electromagnetically - actuated means connected with the latch member to cause it to move before start of a toasting operation to decrease the amount of overlap of the latch and the detent members with increased voltage applied to the toast heating means to decrease the length of time required to effect disengagement therebetween and termination of a toasting operation.

HENRY L. OLSON.